Figure 1:
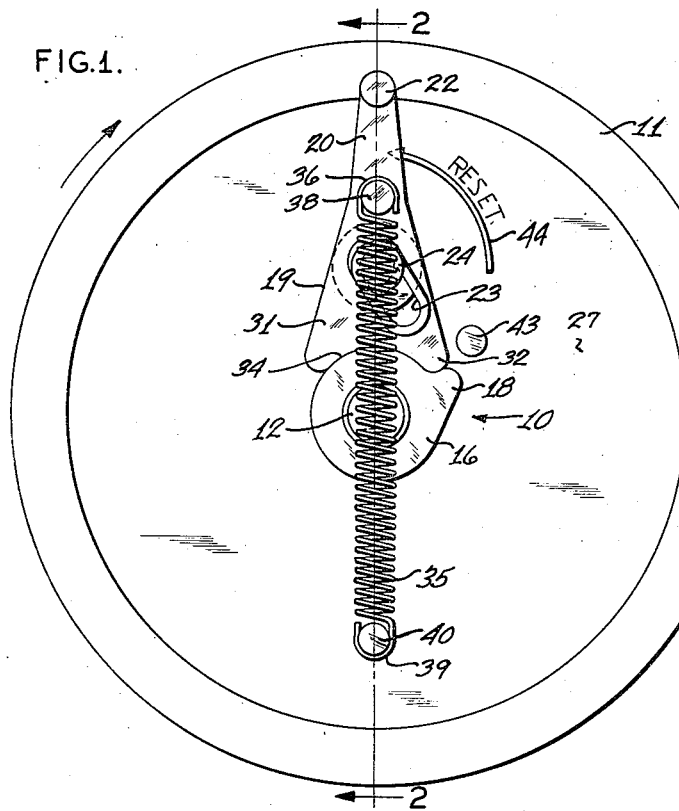

Sept. 9, 1941.  S. C. GEBERT  2,255,211

LOAD LIMITING CLUTCH

Filed March 18, 1940

INVENTOR.
SEVER C. GEBERT
BY
Paul L. Kroher
ATTORNEY.

Patented Sept. 9, 1941

2,255,211

UNITED STATES PATENT OFFICE 2,255,211

LOAD LIMITING CLUTCH

Sever C. Gebert, Oak Park, Ill., assignor to Fairbanks, Morse & Co., Chicago, Ill., a corporation of Illinois Application March 18, 1940, Serial No. 324,523

4 Claims. (Cl. 192—56)

This invention relates to improvements in load limiting clutches, and has particular reference to an improved clutch of greatly simplified construction, providing an effective drive connection between driving and driven members, and operable automatically, in response to minimum overloading of the driven member, to release the connection quickly and effectively.

While the improved clutch embracing the features of the present invention is applicable generally, to machines and apparatus wherein it is desirable or necessary to provide for quick release of driven mechanism from its drive means in response to adverse operating conditions, as in the event of overloading or jamming of the driven mechanism, the clutch has particular utility in connection with domestic stoker apparatus and the like, wherein it may be readily employed to provide the drive connection between the stoker operating motor and the fuel feeding means or fuel conveyor. It will be readily appreciated that the usual grades of coal handled by prevailing types of stokers, may and frequently do contain tramp iron and other infrangible foreign material of a size capable of causing serious overloading or jamming of the conveyor and its operating elements. Accordingly, it becomes of considerable importance to the operating life and efficiency of the stoker fuel conveying mechanism, to make suitable provision for quick release of the conveyor mechanism from the drive means in response to overloading of the conveyor, and for maintaining the drive release or disconnection until restored by an operative, upon correction of the adverse operating condition. The present improved clutch is well adapted to meet the above stated provisions for safe-guarding the feed conveyor and drive means, since it provides, as may be here stated to be the principal object of the invention, a simple and effective device for the purpose, which may be directly associated with driving and driven members to operatively connect them, and wherein the clutch when engaged, will maintain the drive connection for all normal leads up to a predetermined maximum, but will automatically release the connection quickly and positively, in response to minimum overloading of the driven member.

Another object is attained in the provision of an improved clutch of the character indicated, which is comprised of relatively few parts, including coacting clutch elements normally releasably retained in drive engagement by a tension member or spring of a predetermined tensional capacity sufficient to maintain clutch engagement for all normal loads up to a predetermined maximum, the clutch being readily adaptable through the substitution of springs of different predetermined tensional capacities, to provide for power transmission up to any desired predetermined load, beyond which the clutch will automatically release the drive connection.

A further object resides in the provision of a simple and effective overload release clutch which functions automatically and quickly in response to minimum overloading of the driven member, to release the drive connection thereto, but which requires manual resetting to clutch-engaged condition, for further operation of the driven mechanism.

Figure 2:
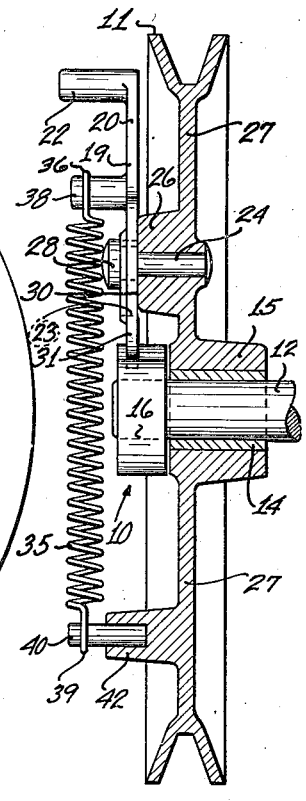
Figure 3:
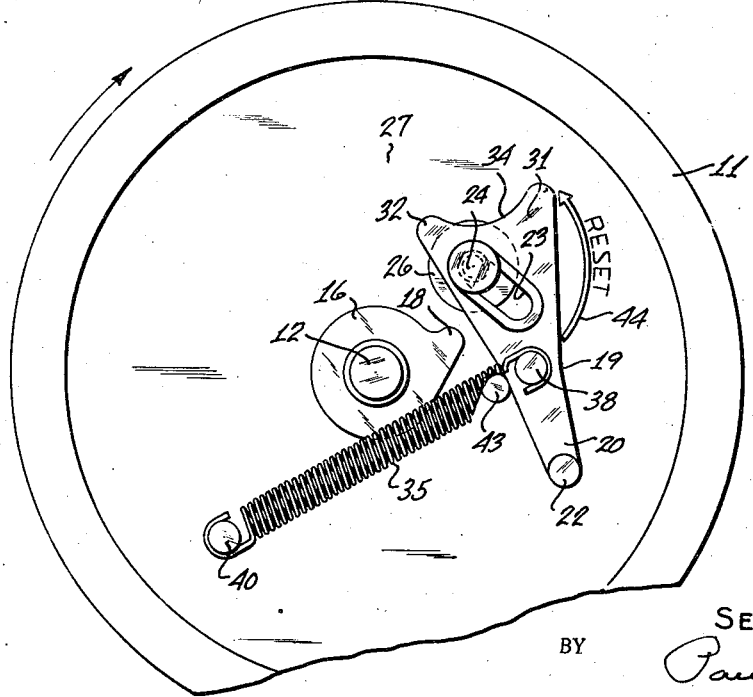

Other objects and advantages of the invention will appear readily from the following description of a preferred embodiment thereof, as exemplified in the accompanying drawing, in which:

Fig. 1 is an assembly elevation in plan of a presently preferred embodiment of the improved load limiting clutch mechanism according to the invention; Fig. 2 is a transverse sectional elevation thereof, as taken along line 2—2 of Fig. 1, and Fig. 3 is a view similar to that of Fig. 1, but illustrating the position of the clutch elements when disengaged.

Referring to the drawing by suitable reference characters, the preferred embodiment illustrated and designated generally by the numeral 10, is shown as applied directly to related driving and driven members 11 and 12 respectively, which are to be operatively connected by the clutch. The driving member 11 is here shown to be a stepped-pulley or sheave adapted for belt-connection to a motor or other source of power (not shown), while the driven member 12 appears as a shaft, upon which the sheave 11 is freely journalled, as through a bearing bushing 14 seated in the sheave hub 15. Where the present improved releasing clutch is employed in a stoker mechanism, the driven shaft 12 may be connected, for example, either directly or through a suitable reduction gear unit (not shown), to a fuel feeding conveyor (not shown).

Arranged on the driven shaft 12 adjacent the hub portion 15 of the sheave 11, is one element 16 of the clutch, this element being an annular collar suitably secured to the shaft, or if desired, formed as an integral part of the shaft. Provided on the peripheral surface of the collar is a rounded finger or projection 18 preferably formed integrally with the collar, the projection presenting, as will hereinafter appear, an abutment and camming means for a clutch element 19 carried by the driving member or sheave 11, the element 19 being engageable with the collar 16 and the projection 18 to provide the clutch drive connection, as will be now described.

The clutch element or pawl 19 comprises a plate which is longitudinally tapered as shown, and which terminates at its narrow end in an arm 20 supporting a laterally projecting finger piece or handle 22, the latter being provided to facilitate manual resetting of the clutch element 19 as will later appear. The central portion of the plate is slotted as at 23, to receive a headed mounting pin 24 which in the clutch assembly, is secured in a lateral boss 26 formed on the sheave web 27 in a zone adjacent the sheave hub 15. The assembly position of the plate is such that it is confined between the pin head 28 and the face 30 of the boss 26, with sufficient clearance to permit through the plate slot 23, both pivotal and displacement movements of the plate relative to the sheave.

The plate at its wide end 31, is adapted for releasable clutching engagement with the collar 16 and the projection 18 thereon, to provide the driving connection between the members 11 and 12. To this end, the plate corners 32 are rounded as shown in Fig. 1, while the plate edge 34 between the rounded corners is inwardly curved such that the curvature thereof corresponds substantially to the peripheral curvature of the collar 16. Thus the plate end is adapted for edgewise frictional contact with the peripheral surface of the collar, and for abutment by one of its rounded corners 32, with the collar projection 18, as clearly appears in Fig. 1. The plate or clutch pawl is yieldably and releasably retained in clutching engagement with the collar by a tension spring 35, one end 36 of which is removably connected to an outstanding lug 38 provided on the plate 19, the spring lug being located on the plate between the plate slot 23 and the handle 22. The opposite end 39 of the spring is similarly removably connected to a pin 40 which is secured in an outstanding boss 42 formed on the sheave web 27. The arrangement of the clutch plate pivot 24 and the spring supporting element 40 on the sheave 11 is such that they are diametrally opposed, as shown in Fig. 1, while the spring supporting lug 38 on clutch plate 19 is located thereon such that when the clutch is engaged, it is aligned with the plate pivot and the element 40. Thus with the clutch engaged, the axis of the clutch spring 35 substantially coincides with the diametral line passing through the elements 40, 24 and 38, so that the spring is related to the clutch pawl 19 such that it may act thereon in a direction to urge the same toward and into edgewise frictional engagement with the pawl-engaging clutch collar 16. Moreover, in the present example, the direction of sheave rotation is clockwise, when looking toward the clutch side of the sheave, such direction being indicated by the arrow in Fig. 1. Accordingly, since the sheave constitutes the driving member of the coupling, the right hand corner 32 (Fig. 1) of clutch plate 19 will engage the collar projection 18 to provide the effective drive connection between the sheave and driven shaft 12, as maintained by the spring 35 in a manner which will now readily appear.

For a given installation of the presently improved clutch mechanism, where it is desired to limit the drive capacity of the clutch to a predetermined maximum load, the clutch spring 35 employed in the device, may be of a predetermined tensional capacity such that throughout normal loading of the driven member, up to the desired maximum load, the spring will maintain the clutch elements engaged. Loading of the driven member above the desired maximum, will immediately effect disconnection of the power drive, through release of the clutch in a manner now to be described.

Upon overloading of the driven member, the driving member or sheave will continue to rotate, while the overloaded driven member will tend to lag, to a degree depending upon the extent of overloading thereof. As a result, the collar projection 18 of the driven member, in driven contact with one rounded corner 32 of the clutch pawl 19, will react upon the pawl, as the latter is rotated with the drive sheave 11, somewhat in the manner of a cam, to pivotally and bodily displace the same about its pivot pin and against the tension of the clutch spring 35. By reason of the clockwise direction of sheave rotation, as viewed from the assembly elevation of Fig. 1, the clutch plate slot 23 is arranged such that when the plate is in clutch-engaged position, its major axis will be directed at an angle to the axis of the spring as a reference, and such that the slot axis will intersect the curved surface of contact between the collar projection 18 and the plate corner 32. Such directioning of the plate slot is necessary, as will be readily understood, in order to permit displacement of the pawl 19 in response to overloading of the driven member 12.

Continuing with the overload release function of the clutch, as the plate 19 is displaced outwardly, away from the clutch collar 16, by the camming action of the collar projection 18 on the plate corner 32, it pivots about the supporting pin 24 in a clockwise direction (Fig. 3), which serves to displace the plate-carried support 38 for the clutch spring, to the right of the diametral line through the pin elements 24 and 40, and thereby to effect an over-center position of the spring. Thereafter, the spring assists the camming function of the collar projection 18, to release the clutch plate 19 from the collar 16, further pivotally displacing the plate in a clockwise direction, toward and against a stop member 43 provided therefor, on the sheave 11. Once the spring is displaced to an initial over-center position, it completes the clutch-releasing displacement of the plate 19 as by a snap-action, thereby assuring an automatic, positive and quick release of the clutch drive connection. The relative positions of the clutch elements when disconnected, clearly appear in Fig. 3.

Reengagement of the clutch is readily effected manually, as by the handle 22' on the clutch plate 19, which enables an operator to pivotally return the plate in the direction of the "reset" arrow 44, to drive engagement with the collar 16 and the projection 18 thereon, this of course being done only after the condition producing the overload is corrected.

It will appear from inspection of Fig. 1, that the clutch may be adapted to a drive in the reverse direction, as counterclockwise, merely by reversing the collar 16, end for end, to properly position the projection 18 for contact with the left hand corner 32 of the plate 19; by re-locating the stop member on the opposite side, and by substituting for the plate 19 shown, a like plate which has the slot 23 arranged oppositely to that shown, to accommodate the counterclockwise drive.

As will be apparent now from the foregoing description of the preferred embodiment of the invention, the clutch may be adapted to release the drive connection at any desired predetermined loading of the driven member, through utilization in the clutch assembly, of a clutch spring characterized by a maximum tensional capacity corresponding to the desired maximum load to which the driven member may be subject. The substitution of one spring for another in the clutch mechanism, may be effected readily and without disconnection of or otherwise disturbing any other part or parts of the clutch, since as appears in Figs. 1 and 2, the pin elements to which the ends of the spring are connected, are adapted for seating of the spring ends thereon in a readily removable manner.

The present improved device provides a simple and efficient clutch which is characterized by positive and quick response to overloading of the driven member, to effect a release of the latter from the drive member. It is particularly adaptable to stoker mechanisms, to provide an effective drive release of the fuel feeding conveyor in response to overloading or jamming thereof, but it is to be understood that such indicated use of the clutch is by way of example only.

It is evident from the foregoing description of a preferred embodiment of the invention, that alterations or modifications in the parts and their arrangement may be made without departing from the spirit and intended scope of the invention as defined by the claims hereunto appended.

I claim:

1. In a load limiting device of the character described, comprising in combination with rotatable driving and driven members, a clutch element on said driven member, a clutch pawl on said driving member, capable of both pivotal and bodily movements relative thereto, said pawl being adapted for clutching engagement with said clutch element upon positionment of the pawl radially of said driving member, a spring between said pawl and driving member, arranged so as to be effective to releasably urge said pawl radially of said driving member into clutching engagement with said clutch element and to maintain said clutching engagement to a predetermined load limit, said clutch element being adapted for causing at said load limit, partial pivotal and bodily movements of said pawl to effect disengagement of the pawl relative to said element, said partial movements of the pawl serving to displace said spring such that the spring thereafter serves to quickly complete the pivotal and bodily movements of the pawl to fully disengage the pawl from the clutch element at said load limit, and means on said pawl by which the pawl may be returned to said position for clutching engagement with said element under the loading of said spring, to restore the driving connection to said driven member.

2. In a load limiting device of the character described, comprising in combination with rotatable driving and driven members, a circular clutch element on said driven member, provided with a projection on the periphery thereof, a clutch pawl movably mounted on said driving member and beng formed to provide at one end, an arcuate surface adapted for frictional engagement with the periphery of said clutch element upon positionment of said pawl radially of the driving member, said pawl having a shoulder adjacent said arcuate surface adapted for driving engagement with the projection of said clutch element, a tension spring between said pawl and driving member, effective in the radial position of the pawl, to urge the pawl into frictional engagement with said clutch element and to maintain said driving engagement of the pawl shoulder and the projection on said clutch element, whereby to drive the driven member to a predetermined load limit, said projection on the clutch element being adapted to act on said pawl shoulder in a manner to cause partial movement of the pawl out of said radial position, at said predetermined load limit, and said spring serving in response to said partial movement of the pawl, to complete the movement thereof at a relatively rapid rate, whereby to disengage said pawl from driving engagement with said clutch element.

3. In a load limiting device of the character described, comprising in combination with rotatable driving and driven members, a clutch element on said driven member, provided with a projection on the periphery thereof, a clutch pawl formed to provide a contact surface laterally of one end, adapted for engagement with the periphery of said clutch element upon positionment of the pawl radially of said driving member, said pawl having a shoulder adjacent said contact surface, provided for abutment with said projection in the drive connection of the pawl and clutch element, said pawl being provided with a slot therein, a pawl mounting element on said driving member and extending through said slot, the mounting element and slot cooperating in supporting the pawl for both pivotal and bodily movements relative to the driving member, a tension spring between said pawl and driving member and so connected thereto as to be positioned diametrally of said driving member and parallel to the longitudinal axis of said pawl upon positionment of the pawl radially of the driving member, said spring serving in such position, to urge the pawl toward said clutch element such that said pawl contact surface frictionally engages the periphery of the element, so that upon rotation of the driving member, said pawl shoulder abuts the projection on said clutch element to complete the driving connection to said driven member, said spring being effective to maintain the driving engagement of said pawl and clutch element to a predetermined load limit, and said projection being adapted to act on said pawl shoulder for causing partial pivotal and bodily movements of the pawl at said predetermined load limit, said partial movements of the pawl thereby serving to displace said spring out of its position diametrally of the driving member, such that the spring thereupon serves to quickly complete the pivotal and bodily movements of the pawl, to effect disengagement of the pawl relative to the clutch element.

4. In a load limiting device of the character described, comprising in combination with rotatable driving and driven members, a clutch element on said driven member, provided with a projection on the periphery thereof, a clutch pawl formed to provide a contact surface laterally of one end, adapted for engagement with the periphery of said clutch element upon positionment of the pawl radially of said driving member, said pawl having a shoulder adjacent said contact surface, provided for abutment with said projection in the drive connection of the pawl and clutch element, said pawl being provided with a slot therein, a pawl mounting element on said driving member and extending through said slot, the mounting element and slot cooperating in supporting the pawl for both pivotal and bodily movements relative to the driving member, a tension spring between said pawl and driving member and so connected thereto as to be positioned diametrally of said driving member and parallel to the longitudinal axis of said pawl upon positionment of the pawl radially of the driving member, said spring serving in such position, to urge the pawl toward said clutch element such that said pawl contact surface frictionally engages the periphery of the element, so that upon rotation of the driving member, said pawl shoulder abuts the projection on said clutch element to complete the driving connection to said driven member, said spring being effective to maintain the driving engagement of said pawl and clutch element to a predetermined load limit, and said projection being adapted to act on said pawl shoulder for causing partial pivotal and bodily movements of the pawl at said predetermined load limit, said partial movements of the pawl thereby serving to displace said spring out of its position diametrally of the driving member, such that the spring thereupon serves to quickly complete the pivotal and bodily movements of the pawl, to effect disengagement of the pawl relative to the clutch element, and means on said pawl by which the pawl may be returned to its position radially of the driving member, for driving engagement with said clutch element under the loading of said spring.

SEVER C. GEBERT.